United States Patent
Joujon-Roche et al.

[15] 3,691,469
[45] Sept. 12, 1972

[54] COUNTERS WITH SCALING FOR DIGITAL CONTROL OF OBJECT'S POSITION

[72] Inventors: Phillip J. Joujon-Roche, Anaheim; Loyd D. Smith, Fullerton, both of Calif.

[73] Assignee: Hughes Aircraft Company, Culver City, Calif.

[22] Filed: May 13, 1970

[21] Appl. No.: 36,737

[52] U.S. Cl. ............................ 328/46, 307/221
[51] Int. Cl. .................................. H03k 21/00
[58] Field of Search .......... 328/46, 37; 307/221, 227

[56] References Cited

UNITED STATES PATENTS

| | | | |
|---|---|---|---|
| 3,562,551 | 2/1971 | Fowler | 328/46 |
| 3,510,576 | 5/1970 | Certanni | 328/37 |

*Primary Examiner*—James W. Lawrence
*Assistant Examiner*—Harold A. Dixon
*Attorney*—James K. Haskell and Walter J. Adam

[57] ABSTRACT

A PPI deflection control system is disclosed employing synchronous counters for accumulating pulses representing $\Delta x$ and $\Delta y$ increments generated by an azimuth-range sweep converter. Range scaling to produce real time X and Y components of a radar sweep for PPI display is achieved by a control signal applied to one of several stages of lower order than fixed stages from which digital outputs are taken for deflection control. The control signal is ORed with the logic input signal for that stage to cause it to change state with each pulse to be counted. Scaled off-center display coordinates may be preset, and overflow may be detected to determine when the electron beam is off the PPI display surface.

13 Claims, 9 Drawing Figures

PATENTED SEP 12 1972　　　　　　　　　　　　　3,691,469

INVENTORS.
PHILLIP J. JOUJON-ROCHE,
LOYD D. SMITH,
BY Walter J. Adam
ATTORNEY.

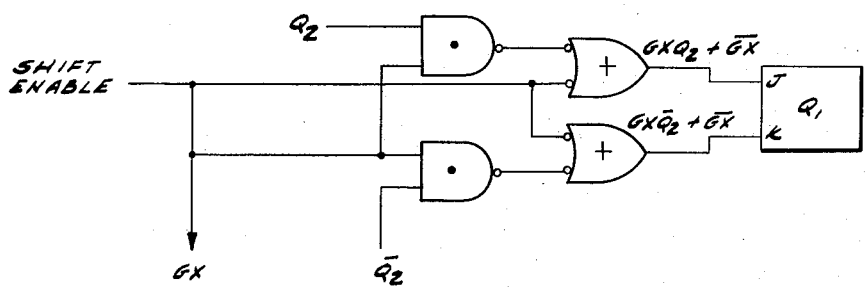

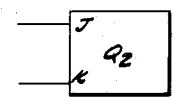

$GXQ_3 + \overline{GX}(CUQ_1 + CD\overline{Q}_1 + S_2)^*$
$GX\overline{Q}_3 + \overline{GX}(CUQ_1 \, CD\overline{Q}_1 + S_2)$

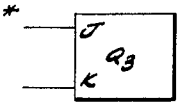

$GXQ_4 + \overline{GX}(CUQ_2 + Q_2^* + CD\overline{Q}_2 Q_2^* + S_3)^*$
$GX\overline{Q}_4 + \overline{GX}(CUQ_2 Q_2^* + CD\overline{Q}_2 Q_2^* + S_3)$

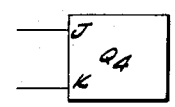

$GXQ_5 + \overline{GX}(CUQ_3 Q_3^* + CD\overline{Q}_3 Q_3^* + S_4)^*$
$GX\overline{Q}_5 + \overline{GX}(CUQ_3 Q_3^* + CD\overline{Q}_3 Q_3^* + S_4)$

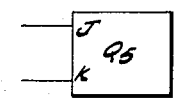

$GXQ_6 + \overline{GX}(CUQ_4 Q_4^* + CD\overline{Q}_4 Q_4^* + S_5)^*$
$GX\overline{Q}_6 + \overline{GX}(CUQ_4 Q_4^* + CD\overline{Q}_4 Q_4^* + S_5)$

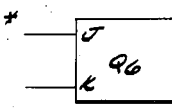

$GXQ_7 + \overline{GX}(CUQ_5 Q_5^* + CD\overline{Q}_5 Q_5^* + S_6)^*$
$GX\overline{Q}_7 + \overline{GX}(CUQ_5 Q_5^* + CD\overline{Q}_5 Q_5^* + S_6)$

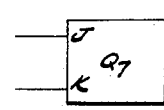

$GXQ_8 + \overline{GX}(CUQ_6 Q_6^* + CD\overline{Q}_6 Q_6^*)$
$GX\overline{Q}_8 + \overline{GX}(CUQ_6 Q_6^* + CD\overline{Q}_6 Q_6^*)$ $Q_6 - Q_{14}$ TO BUFFER REGISTER

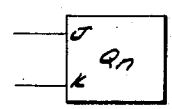

$GXQ_{n+1} + \overline{GX}(CUQ_{n-1} Q_{n-1}^* + CD\overline{Q}_{n-1} Q_{n-1}^*)$
$GX\overline{Q}_{n+1} + \overline{GX}(CUQ_{n-1} Q_{n-1}^* + CD\overline{Q}_{n-1} Q_{n-1}^*)$

*FIG. 6a.*

COUNTERS WITH SCALING FOR DIGITAL CONTROL OF OBJECT'S POSITION

The invention herein described was made in the course of or under a Contract or Subcontract thereunder with the Air Force.

BACKGROUND OF THE INVENTION

This invention relates to digital control of an object's position on a rectangular Cartesian coordinate system, such as the electron beam of a cathode ray tube used in PPI displays, and particularly to apparatus for scaling control, such as range scaling a PPI display.

In a radar system, it is standard practice to present range and bearing information on a plan position indicator (PPI) using a cathode ray tube (CRT) having two orthogonal deflection systems oriented to deflect the electron beam along radial lines in response to X and Y signals coordinated by the radar antenna azimuth according to the following equations:

$$X = R \sin \theta \quad (1)$$

$$Y = R \cos \theta \quad (2)$$

where $\theta$ is the azimuth angle for a given range sweep, and $R$ is the range represented by proportional radial displacement of the cathode ray beam. As each radar pulse is transmitted, the unintensified radar beam starts from an origin and moves radially toward the edge of the display area at a rate that is inversely proportional to the display scale, i.e., to the number of miles to be displayed per unit length of displacement.

The antenna is generally rotated at a uniform rate about a vertical axis so that searching is repeatedly accomplished in a horizontal plane starting at a predetermined position of the antenna relative to the observer. For a centered display, that position ($\theta=0°$) is along the positive Y axis. As the antenna is rotated, it transmits to the display system azimuth (AZ) information in the form of incremental azimuth ($A\theta$) and true north pulses.

The range of an echo received is a function of time. Therefore, to represent range, a counter may be employed to count range pulses ($\Delta r$) during a range sweep period following a transmitted pulse. That period is indicated by a range sweep (RSW) signal transmitted by the radar unit to the display system. Since the radar range and azimuth information received by the display unit is in Polar coordinate form, and the CRT deflection system is adapted to operate with the deflection signals in a rectangular Cartesian coordinate form, a system for a system for a system for Polar-to-Cartesian coordinate conversion is provided.

In general, an azimuth and range converter responds to radar unit signals of $\Delta\theta$, true north and RSW to two trains of clock pulses representing increments $\Delta x$ and $\Delta y$ according to the following equations:

$$\Delta x = \Delta u R + \Delta r \sin \theta \quad (3)$$

$$\Delta y = \Delta v R + \Delta r \cos \theta \quad (4)$$

where $\Delta u = \Delta\theta$ and $\Delta v = -\Delta\theta \sin \theta$. If range is changing very rapidly as compared to azimuth ange $\theta$, as in a conventional search radar, the increments $\Delta x$ and $\Delta y$ may be generated according to the following equations:

$$\Delta x = \Delta r \sin \theta \quad (5)$$

$$\Delta y = \Delta r \cos \theta \quad (6)$$

That may be readily accomplished using digital pulse rate multipliers or digital differential analyzers.

When the sweep angle $\theta$ is changing very rapidly, as compared to range, the increments may be generated according to the following equations:

$$\Delta x = \Delta u R \quad (7)$$

$$\Delta y = \Delta v R \quad (8)$$

where the range $R$ is increased by accumulating clock pulses representing the increments $\Delta r$. The result is a spiral sweep scan for PPI display of sonar information.

For greater accuracy in any sonar or radar PPI display, the increments $\Delta x$ and $\Delta y$ would be generated according to Equations (3) and (4) since they continually take into account changes in both variables of the Polar coordinate system. A conversion system according to those equations would be of particular interest in numerical tool control systems where the rates at which $R$ and $\theta$ change may vary from time to time, or job to job.

To continually provide the Cartesian coordinate values X and Y from the increments $\Delta x$ and $\Delta y$, the increments are accumulated in X and Y counters adapted to count up when the signs of the respective increments are positive, and down when the signs are negative. If the Y axis is the reference for the angle $\theta$, and if each sweep begins at the origin as it does for a PPI display, the signs of the increments $\Delta x$ and $\Delta y$ correspond directly with the signs or polarities of the signals $\sin \theta$ and $\cos \theta$, and for a radar PPI display, where each radar pulse transmitted causes the scan to begin again at the origin, the X and Y counters can be controlled to count up or down according to whether the respective signs of $\sin \theta$ and $\cos \theta$ are positive or negative.

When the azimuth angle is assumed to be constant during a radar range sweep, the task of generating the coordinates X and Y is greatly simplified. After each range sweep, and during radar dead time, the X and Y counters are reset. Then during the ensuing radar live time, the counters are allowed to count up or down, depending only upon the quadrant of the range sweep (i.e., depending only upon the signs of $\sin \theta$ and $\cos \theta$).

An off-center PPI display is controlled in the same manner, but instead of resetting the X and Y counters to zero during radar dead time, they are set to the reciprocal or complementary values of the point to be displayed at the center. This will cause the origin of the radar range sweep to appear off center. Thus, while the origin of the sweep is normally at the origin of the Cartesian coordinate system, it is often desirable to move the origin of the sweep off center, such as to focus attention on a particular target area. At the same time, it is desirable to change the scale from, for example, 512 nautical miles to only 32 nautical miles for a full range sweep from the center to the edge of the display area.

Scaling has been accomplished in the past by monitoring different stages of the X and Y counters for the different range scales. The monitoring was effectively carried out by a digital-to-analog (D/A) converter connected to different stages (orders) of the respective X and Y counters by means of a tree of relays. Relay switches first used for range scale selection were a source of system noise and maintenance problems. Integrated circuit (IC) logic has improved range scale selection on both points, but requires additional logic cards in the system.

It would be desirable to have permanent connections to output terminals of the X and Y counters and to vary the scale of data presented at the output terminals with control signals in the counter logic. In that way reliable and noise free scaling may be provided at virtually no increase in cost and space for the counters, particularly where IC logic is employed for the counters. This is because additional logic elements, such as NAND gates, can usually be included on an individually packaged IC flip-flop chip used to make up several orders of a counter. If specially designed IC flip-flop chips Are employed, the additional logic elements for range scaling may be included in the counter control logic at the time the "art work" is done for the chips. If general purpose IC chips from a commercial supplier are employed, more logic elements are usually present than are required for the task. In either case, there is no increase in cost or space in providing range scaling as an integral part of the counter control.

SUMMARY OF THE INVENTION

An object of this invention is to provide scaling of increments accumulated by a counter in response to scaling control signals without requiring any changes in the stages monitored for the scaled sum of the increments accumulated.

Another object of this invention is to effect scaling of data presented at output terminals of predetermined stages of a synchronous counter with control signals in the counter logic for the least significant bit position of those predetermined counter stages, and additional counter stages which precede that least significant bit position.

Another object is to effect scaling of a value to be entered into a synchronous counter having a predetermined number of stages monitored in order to continually determine the algebraic sum of increments accumulated and the value initially entered.

Still another object is to provide for detecting overflow of scaled increments accumulated by a counter.

And yet another object is to provide for detecting an overflow of a counter and for determining whether the counter is accumulating increments that will increase the overflow in order to terminate the process of accumulating increments as long as that condition exists.

In accordance with the present invention, scaling is achieved in an $(N-1)+M$ bit synchronous counter adapted to count pulses representing events with N scales by providing output terminals from the M most significant of the $(N-1)+M$ counter stages, and decreasing the scaling factor from $2^{n-1}$ to $2^0$, by applying a control signal to a stage of next higher order to cause that stage to change state upon the occurrence of each event. The stages of lower order than the order to which the scaling control signal is applied will then make no contribution to the binary output from the M most significant orders. If no control signal is applied to any stages of the orders $2^1$ to $2^n$, only the order $2^0$ will change state upon the occurrence of each event, and the scale factor will be the maximum $2^{n-1}$. According to a further feature, the scaling control signal is ORed with up and down counting logic of the synchronous binary counter.

In accordance with another feature of the present invention, the scaled counter may be preset by entering a scaled number in binary form plus sign with negative numbers in the 2's complement form. The least significant bit is always entered into the stage of the counter designated as the least significant of N bit positions; other bits of higher order are entered in successive stages of higher order with the sign in the stage of highest order, i.e., the last of $(N-1)+M$. Scaling the M-bit number thus entered is then accomplished by shifting it to positions of lower order with the most significant stages thus vacated filled with the same sign as entered into the most significant of the M stages. Of the M stages, the most significant stage is monitored as the sign and the next $N-1$ most significant stages are monitored only to determine when there is an overflow, i.e., a number in the counter greater than $2^{M-n}$ by noting when any one of the $N-1$ next most significant stages contains a binary digit which differs from the sign digit. If an overflow is detected, further logic means determines whether the counter is counting in a direction to increase the overflow. If so, pulses representing events being counted are inhibited.

The novel features that are considered characteristic of this invention are set forth with particularity in the appended claims. The invention will best be understood from the following description when read in con-junction with the accompanying drawings.

DESCRIPTION OF THE DRAWINGS

FIGS. 6a, 6b and 6c together illustrate the control logic of an X-counter provided in accordance with the present invention in the deflection control unit illustrated in FIG. 2.

DESCRIPTION OF THE PREFERRED EMBODIMENT

Figure 1:
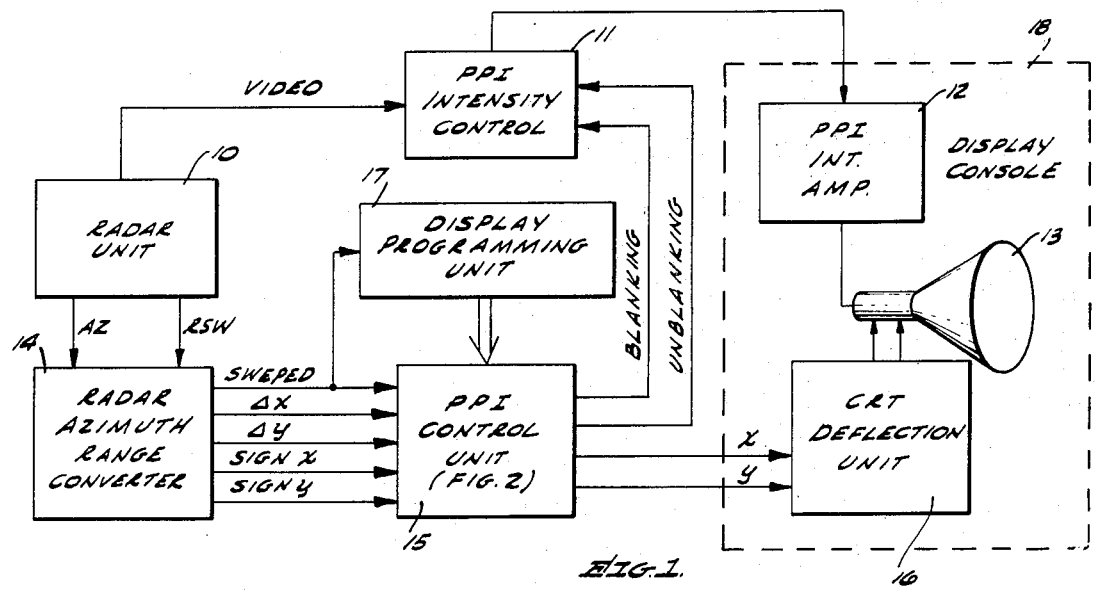
FIG. 1 is a block diagram of a radar system with a PPI display.

Referring first to FIG. 1, a radar display system embodying the present invention includes a radar unit 10 which transmits a video signal to a PPI intensity control unit 11 for controlling a PPI intensity amplifier 12 to display video information on the face of a cathode ray tube 13 in synchronism with operation of the radar unit 10 as it sweeps in azimuth and range.

A radar azimuth converter 14 receives azimuth (AZ) and range sweep (RSW) data from the radar unit 10 and converts the data into trains of pulses representing increments $\Delta x$ and $\Delta y$ to control the cathode ray tube 13 for a PPI display with a Cartesian coordinate system as range increases from zero during each of a succession of range sweep periods at different angles of azimuth. The control is through a PPI control unit 15 which accepts the trains of pulses $\Delta x$ and $\Delta y$ and converts them to analog voltages X and Y employed to produce a radar sweep on the cathode ray tube 13 through a conventional CRT deflection unit 16.

As will be noted more fully hereinafter with reference to FIGS. 2 and 6, offset coordinates X' and Y' may be entered into the PPI control unit 15 to display any point at the center of the display area, thereby offsetting the origin of the PPI sweep from the center. In addition, radar display ranges of, for example, 16, 32, 64, 128, 256 and 512 nautical miles may be selected by scaling X and Y counters in the PPI deflection control unit in accordance with the present invention as will be described with reference to FIG. 6.

In addition to the pulse trains $\Delta x$ and $\Delta y$, the PPI control unit 15 also receives signals representing the sign of $\Delta X$ and the sign of $\Delta Y$ as computed by the radar azimuth converter 14 from the azimuth signal it receives from the radar unit 10. As in the case of generating the train of pulses $\Delta x$ and $\Delta y$, various techniques may be employed to compute the signs of $\Delta X$ and $\Delta Y$ from the azimuth signal.

A typical technique for a true bearing display on the cathode ray tube 13 is to provide the azimuth signal as a sinusoidal signal, and obtain from it a square-wave signal that represents the sign of $\Delta X$ (which is positive during the positive half-cycle of the azimuth signal, i.e., during the azimuth sweep period from 0° to 180°). Thus, the sign of $\Delta X$ can be derived directly from the sinusoidal azimuth signal since it corresponds directly with the sign of sin $\theta$. If a second 90° phase shifted signal is derived from the sinusoidal azimuth signal, the second signal representing cos $\theta$ may then be employed to derive in a similar manner the sign of $\Delta Y$ since it corresponds directly with the sign of cos $\theta$. The signs of $\Delta x$ and $\Delta y$ are then employed by the PPI control unit 15 to control X and Y counters so that they count up when the respective signs of $\Delta x$ and $\Delta y$ are positive and to count down when the respective signs of $\Delta x$ and $\Delta y$ are negative.

To synchronize operation of the PPI control unit 15 with successive range sweeps, the radar azimuth converter 14 receives the range sweep signal (RSW) and transmits to the PPI deflection control unit 15 a sweep pedestal signal (SWEPED) to indicate radar live time. That signal is also transmitted as a synchronizing signal to a display programming unit 17 which responds to a system clock $C_1$ from a local oscillator (operating at a frequency of 1.67 Hz) to allow loading offset data into the X and Y counters in the PPI control unit 15.

In practice, the display programming unit 17 will also accept timing signals and various control signals from a data distribution unit (not shown) interfacing with a digital data processor to allow transfer of data into and out of appropriate functional areas in the system. These signals are also used by the display programming unit 17, in conjunction with operator selections made at a display console represented in FIG. 1 by a dotted line block 18, to provide data synchronization throughout the entire system. However, in order to provide a description of the present invention, in concise terms, the ancillary functions of the display programming unit 17, as well as all other components of the system thus far described, except the PPI control unit 15, will not be further referred to herein except insofar as operation of the PPI control unit 15 requires. Thus, the block diagram of FIG. 1 is only intended to illustrate a typical environment for the present invention relating to organization and operation of X and Y counters in a CRT deflection control system.

The display programming unit 17 controls presetting the counters in the PPI control unit 15 before each range sweep display as just noted. It also transmits radar display range control signals $S_1$ to $S_6$ to the PPI control unit 15, but it should be understood that these control signals may be entered at the display console by an operator. In either case, the desired communication between the display programming unit 17 and the PPI control unit 15 is represented in FIG. 1 by a cable 19.

Blanking and unblanking signals are transmitted by the deflection control unit 15 to the intensity control unit 11 during respective radar dead times and live times with a slight delay in transmitting unblanking signals. This delay in initiating the unblanking period protects the phosphor on the face of the cathode ray tube where sweep concentration is the greatest.

Figure 2:
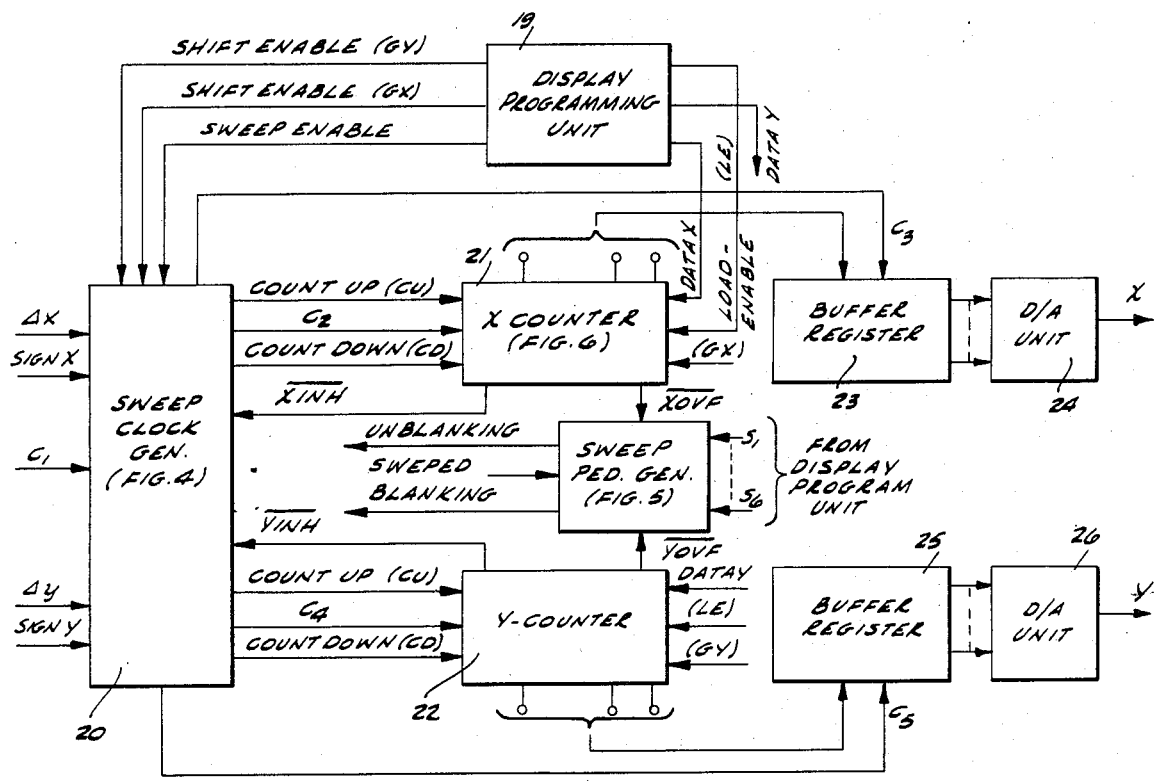
FIG. 2 is a block diagram of deflection control unit incorporating the present invention for the PPI display of FIG. 1.

Referring now to FIG. 2, the PPI control unit 15 (FIG. 1) comprises four major sections. The first section is a sweep clock generator 20 consisting of two identical channels, one for the control of the X counter shown as a block 21, and the other for the Y counter shown as a block 22. Since they are identical, only the channel for the X counter will be described with reference to FIG. 4.

The train of pulses $\Delta x$ and $\Delta y$ are reshaped by the sweep clock generator 20 for transmittal as input pulses $C_2$ and $C_4$ to the respective X and Y counters. Once there has been a change in the content of the X counter 21 in response to a pulse $C_2$, a delayed pulse $C_3$ gates the content of the X counter 21 into a buffer register 23. There it is stored for digital-to-analog conversion by a D/A unit 24. The content of the Y counter is similarly gated by a delayed pulse $C_5$ into a buffer register 25 for conversion into an analog signal Y by a D/A unit 26. Each of the X and Y counters consists of 20 flip-flops and control logic to count up or down as determined by the sweep clock generator 20 in response to the sign of $\Delta x$ and the sign of $\Delta y$, respectively.

It should be noted that the D/A unit 24 (FIG. 2) which receives the coordinate values in binary form via the buffer register 23 may be implemented in a conventional manner, taking into consideration that negative values are in the 2's complement form. For example, two D/A converters may be provided, one for positive numbers and one for negative numbers. The output of one converter may then be gated out to the CRT deflection unit 16 (FIG. 1). However, a single D/A converter may be provided of the type which sums weighted currents. For a positive binary number, the weighted currents controlled by n binary digits are $2^0I$, $2^1I...2^nI$. For a negative number, a binary 1 in the sign bit position turns on a negative current of amplitude $2^nI$. Thus, when the negative sign current is summed with the positive digit currents, the analog output signal X is automatically provided with proper polarity.

It is recognized that a converter of the weighted-current type can present design problems for large binary numbers, such as 9-bit numbers, because of the large range of current amplitudes controlled by the binary digits. To minimize those problems, the most significant 3 bits may be decoded into a 15 mono-digit number to turn on a corresponding number of currents of unit amplitude. The balance of the original nine binary digit number is then used to turn on binary weighted currents on which are properly scaled for summing with the mono-digit currents. The sum may then be added to a sign-bit weighted negative current to provide both positive and negative analog output signals. In practice, this hybrid (mono-digit and binary-digit) technique is preferred. However, it forms no part of the present invention since any technique known to those skilled in the art may be employed for the digital-to-analog conversion required.

Provision is made for shifting into the counters the 2's complements of coordinates for an off-center display or all zeros for a centered display. In either case, the counters are effectively cleared and reset for the next range sweep during radar dead time. Counting begins from the preloaded state as soon as the signal SWEPED comes on (becomes true) and continues until the next radar dead time (when the signal SWEPED is set false), or until an overflow condition is detected and the counter is counting further off scale. The overflow condition for each counter is detected by monitoring counter stages in more significant bit positions than the most significant bit position of a binary number transferred to the buffer register.

When an overflow condition exists in either the X or the Y channel, the cathode ray tube is blanked through the PPI intensity control unit 11 (FIG. 1). When the overflow condition is no longer true, the cathode ray tube is unblanked by the sweep pedestal generator 27, but not until after a delay of about 15 microseconds. The delay time allows time for the sweep to slew from the center to the edge of the display. This is necessary because immediately after overflowing, in the positive direction, the content of the counter will be all zeros and just after counting back to within the display area the counter will contain all ones, and vice versa for a negative overflow. Thus the transition from an overflow condition back to a no-overflow condition requires deflection of the electron beam from the center to the edge of the display area. Therefore, while an overflow condition causes immediate blanking, the return to a no-overflow condition will produce unblanking with a 15 microsecond delay.

Once an overflow condition is detected in either channel, the sweep pedestal generator 27 further determines whether the counter in question is counting further off, and if so, an inhibit signal (XINH or YINH) is transmitted to the counter that has overflowed to inhibit counting until the direction of counting has been reversed. This prevents unnecessary exercise of the CRT deflection unit 16 (FIG. 1).

The foregoing general discussion with reference to FIGS. 1 and 2 provides a typical environment for the present invention which relates to scaling of the X and Y counters. Accordingly, it should be understood that the system thus far described is by way of example, and not by way of limitation.

To better understand the environment for the present invention, a general timing diagram will now be described with reference to FIG. 3 which shows the system clock pulses $C_1$ generated continuously during both dead time and live time of the radar system. A load enable (LE) signal is generated by the display programming unit 17 during radar dead time to allow coordinate values to be entered into the X and Y counters for an off-center display. At the same time, a shift enable signal is transmitted to the sweep clock generator 20 (FIG. 2) to enable system clock pulses $C_1$ to be transmitted as clock pulses $C_2$ and $C_4$ to the X and Y counters. The shift enable signal then allows these clock pulses thus generated during radar dead time to operate the counters as shift registers clear them by shifting in the 2's complements of offset coordinates. The timing of the shift enable signal in the display programming unit may be implemented with a flip-flop set by the next system clock pulse $C_1$ and a binary counter which counts up from zero until a predetermined number of system clock pulses $C_1$ have been gated to the X and Y counters. Once that number has been detected, the shift enable flip-flop is reset to terminate transmission of system clock pulses $C_1$ to the X and Y counters. At the same time the shift enable flip-flop is reset, the counter which meters the system clock $C_1$ for a shift operation during dead time may be reset to zero to prepare it for another operation during the next radar dead time, Thus, while the load enable signal is true for only a predetermined number of system clock periods sufficient to enter offset coordinates serially, the shift enable signal is true for an additional number of clock periods to scale the offset coordinates. That scaling is programmed or otherwise selected in the display programming unit 17 (FIG. 1).

Figure 3:
FIG. 3 is a timing diagram for the operation of the deflection control unit of FIG. 2.

The signs of $\Delta x$ and $\Delta y$ are computed by the radar azimuth converter 14 (FIG. 1) at the beginning of dead time as shown for the sign of $\Delta x$ in FIG. 3. In that regard, it should be noted that a positive sign is represented by a binary 0 at a 0-volt level and a negative sign by a binary 1 at a 5-volt level. Accordingly, the signal sign $\Delta x$ illustrated in FIG. 3 is for a negative sign. That signal is received by the sweep clock generator 20 (FIG. 2) to generate a count-up (CU) signal when the sign is positive and a count-down (CD) signal when the sign is negative, but not until after the shift enable signal has returned to zero. The count-up signal illustrated is positive at the end of the last radar live time and is returned to the 0-volt level as soon as the sign of $\Delta x$ changes from positive to negative during the following radar dead time. The count-down signal then becomes positive, but only until the next clock pulse $C_1$ initiates the shift enable signal to inhibit transmission of either a count-up or a count-down control signal until after the shift enable period has terminated. In that manner, a negative sign for $\Delta x$ will provide a count-down control of the X counter from the end of the shift enable period through the following radar live time.

Figure 4:
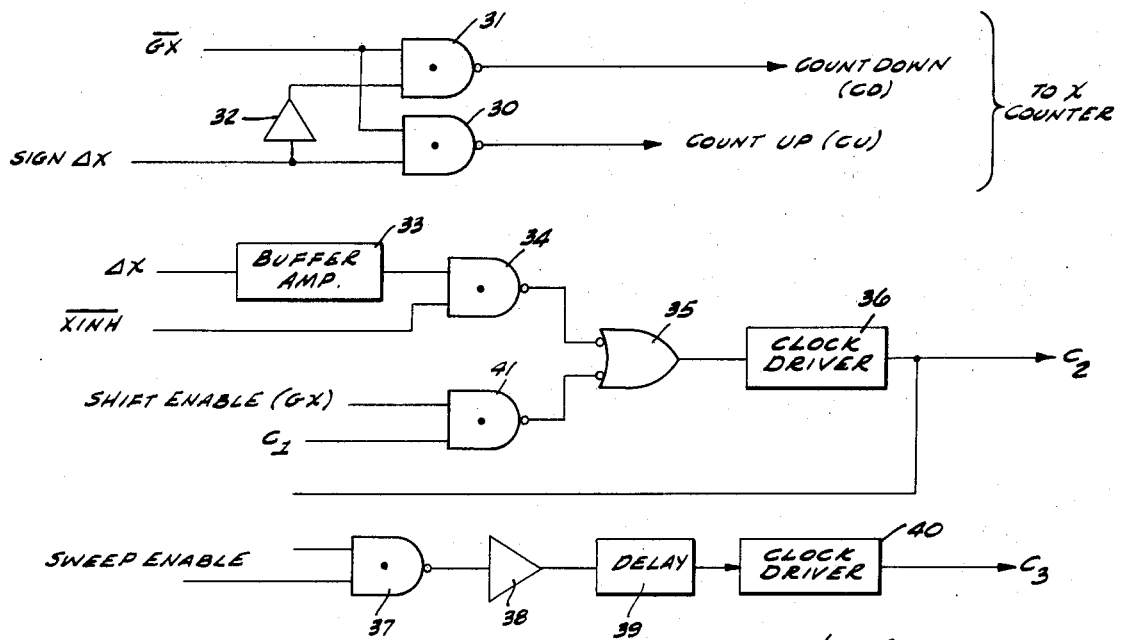
FIG. 4 is a logic diagram of a sweep clock generator for the deflection control unit illustrate in FIG. 2.

The sweep clock generator 20 (FIG. 2) will now be described with reference to FIG. 4. Since both channels for the X and Y counters are the same, only the channel for the X counter is shown. The signal sign $\Delta x$ received by the sweep clock generator is transmitted as the count-up signal (CU) to the X counter through a NAND gate 30, if the sign of the increments $\Delta x$ is positive, and a count-down signal (CD) to the X-counter through a NAND gate 31 if the sign of the increments $\Delta x$ is negative, but only while the shift enable signal is false (i.e., only while $\overline{\text{SHIFT ENABLE}}$ is true). An inverter 32 provides complements for the signal for the sign of $\Delta x$ to provide the correct logic level for a countdown operation.

The train of pulses representing increments $\Delta x$ are received by a buffer amplifier 33 in the sweep clock generator and transmitted as clock pulses $C_2$ via cascaded NAND gates 34 and 35 which together provide respective AND and OR functions. A clock driver 36 is provided to assure sufficient power to drive all stages of the X counter implemented as a synchronous counter. Clock pulses $C_2$ are thus generated to drive the X counter up or down throughout radar live time, unless the X counter overflows.

An overflow condition is detected by monitoring sign bit positions of the X counter of greater significance than the most significant non-sign bit transmitted to the buffer register 23 (FIG. 2), as noted hereinbefore. A more detailed description of the manner in which overflow detection may be implemented will be described with reference to FIG. 6.

A signal XOVF representing the overflow condition is then effectively combined with the count-up and count-down signals CU and CD being transmitted to the X counter to determine whether the X-counter is counting further off the display area. If so, a $\Delta x$ inhibit signal XINH is generated, and the complement $\overline{\text{XINH}}$ is applied to the NAND gate 34 to inhibit further transmission of clock pulses $C_2$. The buffer amplifier 33 is implemented as a non-inverting amplifier so that positive pulses representing increments $\Delta x$ will be transmitted as positive pulses through the NAND gates 34 and 35 and the non-inverting clock driver 36.

Each time a clock pulse $C_2$ is applied to the X counter, the content thereof is changed, thereby requiring a change in the analog signal X transmitted by the D/A unit 24 (FIG. 2). Accordingly, the buffer register 23 must then be updated after each increment $\Delta x$ but not until sufficient time has been allowed for the X counter to settle. Therefore, a delayed clock pulse $C_3$ is generated during radar live time from each clock pulse $C_2$ through a NAND gate 37, inverter 38 and a delay element 39 (such as a delay line or monostable multivibrator) having a delay period of typically 140 microseconds. A clock driver 40 reshapes the clock pulse $C_3$ and provides sufficient power to effect parallel transfer of the contents of the X counter to the buffer register 23 (FIG. 2).

The clock pulses $C_3$ are only generated while a sweep enable signal applied to NAND gate 37 is true. That signal is normally true and made false by the display programming unit 17 (FIG. 1) only for periods during which the cathode ray tube 13 is being employed for other than a PPI display, such as for display of symbols.

During radar dead time, the shift enable signal gates system clock pulses $C_1$ through a NAND gate 41 into the OR gate 35 in order to provide clock pulses $C_2$ for operation of the X counter as a shift register. The control logic for the counter includes the shift enable signal as a term to inhibit operation as a counter and allow the shifting operation to take place. The sweep enable signal may be true during radar dead time, but the clock pulses $C_3$ transmitted by the clock driver 40 to the buffer register 23 (FIG. 2) will have no effect on the display since the cathode ray tube is blanked during radar dead time.

Figure 5:
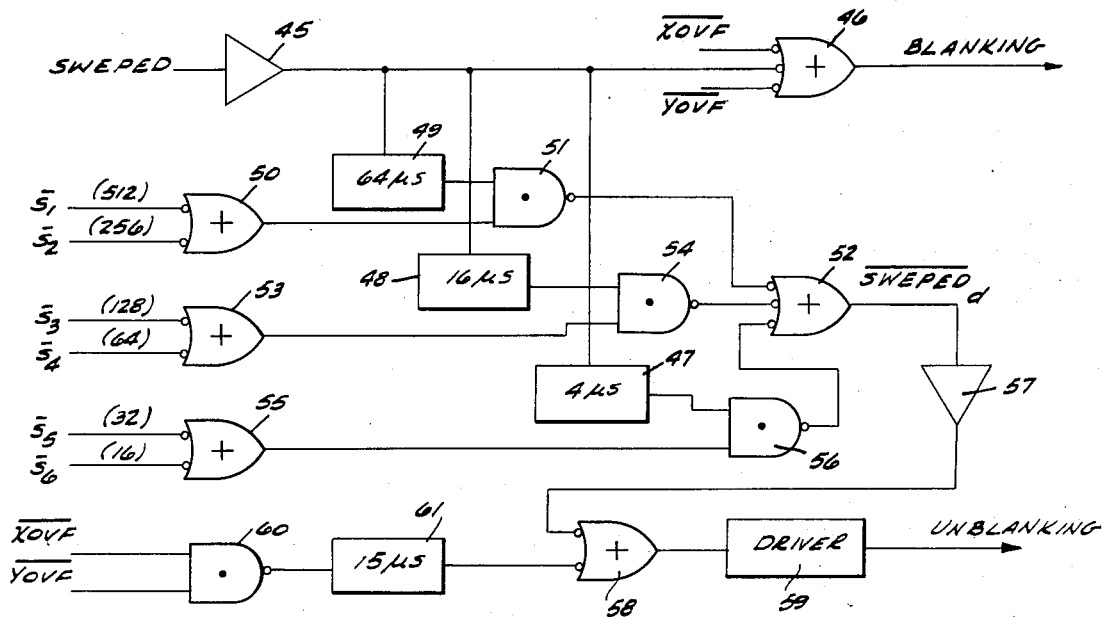
FIG. 5 is a logic diagram of a sweep pedestal generator for the deflection control unit illustrated in FIG. 2.

Referring now to FIG. 5, the sweep pedestal signal SWEPED is complemented by an inverter 45 and then recomplemented by a NAND gate 46 (functioning as an OR gate) to provide a signal for blanking control of the cathode ray tube through the PPI intensity control unit 11 during radar dead time. The PPI intensity control unit 11 will blank the cathode ray tube on the leading edge of the signal $\overline{\text{SWEPED}}$ and will unblank on the trailing edge of the signal $\overline{\text{SWEPED}}$ after a delay of 4, 16 or 64 microseconds introduced by respective delay elements 47, 48 and 49, depending upon the range scale selected for the X and Y counters. The scales for the radius of the display area are 512, 256, 128, 64, 32 and 16 nautical miles and are selected by respective signals $S_1$, $S_2$, $S_3$, $S_4$, $S_5$, and $S_6$. Complements of the range scale selecting signals $S_1$ and $S_2$ for the greatest scales are ORed by a NAND gate 50 to enable a NAND gate 51 to transmit a delayed sweep pedestal signal $\overline{\text{SWEPED}}$ through a NAND gate 52. Complements of the range select signals $S_3$ and $S_4$ for the next two smaller scales are ORed by a NAND gate 53 to enable a NAND gate 54. Similarly, complements of the range select signals $S_5$ and $S_6$ are ORed by a NAND gate 55 to enable a NAND gate 56.

The output of the NAND gate 52 is complemented by an inverter 57 and ORed by a NAND gate 58 to provide an unblanking control signal through a driver 59. In that manner, a blank circle of substantially uniform diameter is maintained about the origin of the PPI sweep to prevent damage to the phosphor where sweep concentration is the greatest, as noted hereinbefore.

As soon as a counting operation is enabled by the shift enable signal (GX) going false, and $\Delta x$ and $\Delta y$ pulses are received, the range sweep is initiated. However, if an overflow condition is present, or subsequently occurs, the electro beam of the cathode ray tube will be blanked by the complement ($\overline{\text{XOVF}}$) of the overflow signal applied to the NAND gate 46. An overflow signal $\overline{\text{YOVF}}$ in the Y channel will similarly provide a blanking control signal. Once both of the overflow signal complements $\overline{\text{XOVF}}$ and $\overline{\text{YOVF}}$ are true (i.e., when an overflow condition no longer exists in either the X or the Y channel), an unblanking control signal is initiated through a NAND gate 60, which functions as an AND gate, and the NAND gate 58, but with a delay of approximately 15 microseconds introduced by a delay element 61 to allow time for the CRT deflection unit 16 (FIG. 1) to settle.

The counter for the X channel will now be described with reference to FIGS. 6a and 6b. The counter for the Y channel is identical except that the control signals CU and CD in that channel are derived from the signal representing the sign of $\Delta y$ increments.

The X counter consists of 20 J-K flip-flops $Q_1$ to $Q_{20}$ with logic for operation as a synchronous binary counter with ripple carry during radar live time while the shift enable signal (GX) is not true, and as a shift register while the signal GX is true.

Only flip-flops $Q_6$ to $Q_{14}$ are monitored for transfer of scaled coordinate values to the buffer register 23 (FIG. 2) upon the occurrence of each clock pulse $C_3$. The sign of the scaled coordinate value entered during the shift-enable period, i.e., during radar dead time, is also monitored and transferred to the buffer register 23. The sign bit never changes during normal operation when an overflow occurs, except while passing through zero for an offset display, because of the intervening stages $Q_{15}$ to $Q_{19}$. The flip-flop $Q_6$ is the position of the least significant bit for the scaled coordinate value.

An X coordinate value for an off-center display is entered serially during radar dead time while the load enable signal is true, as noted hereinbefore. In practice, an off-center display is desired to move a point in the radar field of view to the center of the display. Accordingly, the offset value entered is the 2's complement of the coordinate value of the point to be moved to the center, and consists of 14 datum bits and one sign bit.

The load enable (LE) signal is held true for 15 clock periods to shift the offset value into flip-flops $Q_6$ to $Q_{20}$, inclusive. If the greatest scale is selected by the signal $S_1$, the shift enable signal (GX) is held true by the display programming unit for 5 additional clock pulses to shift the datum bits into flip-flops $Q_1$ to $Q_{14}$ and copy the sign bit into flip-flops $Q_{15}$ to $Q_{19}$. Copying the sign bit is automatic since once the signal LE is false, the flip-flop $Q_{20}$ cannot change state. When one of the other scales is selected by one of the signals $S_2$, $S_3$, $S_4$, $S_5$ and $S_6$ the shift enable signal is held true for only 4, 3, 2, 1 and 0 additional clock periods. The following table summarizes the condition of the counter after the shift enable signal is turned off (set false).

| Range Scale | Datum Bits | Sign Bit | States Disregarded |
|---|---|---|---|
| $S_6$ | $Q_6$ to $Q_{19}$ | $Q_{20}$ | $Q_1$ to $Q_5$ |
| $S_5$ | $Q_5$ to $Q_{18}$ | $Q_{19}$ to $Q_{20}$ | $Q_1$ to $Q_4$ |
| $S_4$ | $Q_4$ to $Q_{17}$ | $Q_{18}$ to $Q_{20}$ | $Q_1$ to $Q_3$ |
| $S_3$ | $Q_3$ to $Q_{16}$ | $Q_{17}$ to $Q_{20}$ | $Q_1$ to $Q_2$ |
| $S_2$ | $Q_2$ to $Q_{15}$ | $Q_{16}$ to $Q_{20}$ | $Q_1$ |
| $S_1$ | $Q_1$ to $Q_{14}$ | $Q_{15}$ to $Q_{20}$ | — |

The stages disregarded are indicated in the last column. They are disregarded because the range scale signal selected is applied to the stage of the least significant datum bit entered for operation as the least significant bit of the binary counter. Therefore, the states of stages of lower order in the counter will not have effect on the state of the stage to which the scaling signal is applied. Thus, the more significant the binary position of the stage (flip-flop and ripple carry logic) to which the scaling signal is applied, the smaller the scale (radar range inch of display). In other words, the smaller the scale selected, the more significant the contribution of an increment $\Delta x$ to the X deflection value read out to the buffer register from flip-flops $Q_6$ to $Q_{14}$.

The control logic for operation of the counter flip-flops $Q_1$ to $Q_{20}$ as a shift register is such that, upon the occurrence of a clock pulse while the shift enable signal is true (i.e., while GX is true), the state of a given flip-flop $Q_n$ is set according to the state of the next flip-flop $Q_{n+1}$ of higher order. The shift control logic for all flip-flops, except flip-flop $Q_{20}$, is as follows:

$$J Q_n = GX \, Q_{n+1} \quad (9)$$

$$K Q_n = GX \, \overline{Q}_{n+1} \quad (10)$$

For the flip-flop $Q_{20}$ the control logic is as follows:

$$J Q_{20} = LE \, D_1 \quad (11)$$

$$K Q_{20} = LD \, \overline{D}_1 \quad (12)$$

where $D_1$ is the least significant bit position of a datum register in the display programming unit from which the coordinate value is received serially.

It should be noted from the range scaling table set forth hereinbefore that an offset value entered and scaled will sometimes leave datum bits in the flip-flops $Q_{15}$ to $Q_{19}$, thereby starting a counting operation during the following radar live time with an overflow condition. That condition is detected by a logic network 65 shown in FIG. 6b according to the following equation:

$$XOVF = (Q_{15}+Q_{16}+Q_{17}+Q_{18}+Q_{19}) \overline{Q}_{20}$$
$$+ (\overline{Q}_{15}+\overline{Q}_{16}+\overline{Q}_{17}+\overline{Q}_{18}+\overline{Q}_{19}) Q_{20} \quad (13)$$

The first term of the equation is for detecting a positive overflow, and the second term is for detecting a negative overflow. The overflow signal XOVF will immediately initiate a blanking control signal in the sweep pedestal generator 27 (FIG. 2) via an inverter 66 which provides the complement $\overline{XOVF}$ required by the NAND logic gate 46 of that generator. When an overflow condition is no longer present in either channel, an unblanking control signal is generated, as described hereinbefore with reference to the NAND gate 60 of that generator. If an overflow condition occurs later during radar live time, it is detected and the blanking control signal is generated in the same manner.

The overflow signal XOVF is also effectively used in the overflow logic network to initiate an inhibit signal XINH if the X counter is counting further off the display area according to the following logic equation:

$$XINH = (Q_{15}+Q_{16}+Q_{17}+Q_{18}+Q_{19}) \overline{Q}_{20} \, CU$$
$$+ (\overline{Q}_{15}+\overline{Q}_{16}+\overline{Q}_{17}+\overline{Q}_{18}+\overline{Q}_{19}) Q_{20} \, CD \quad (14)$$

Figure 7:
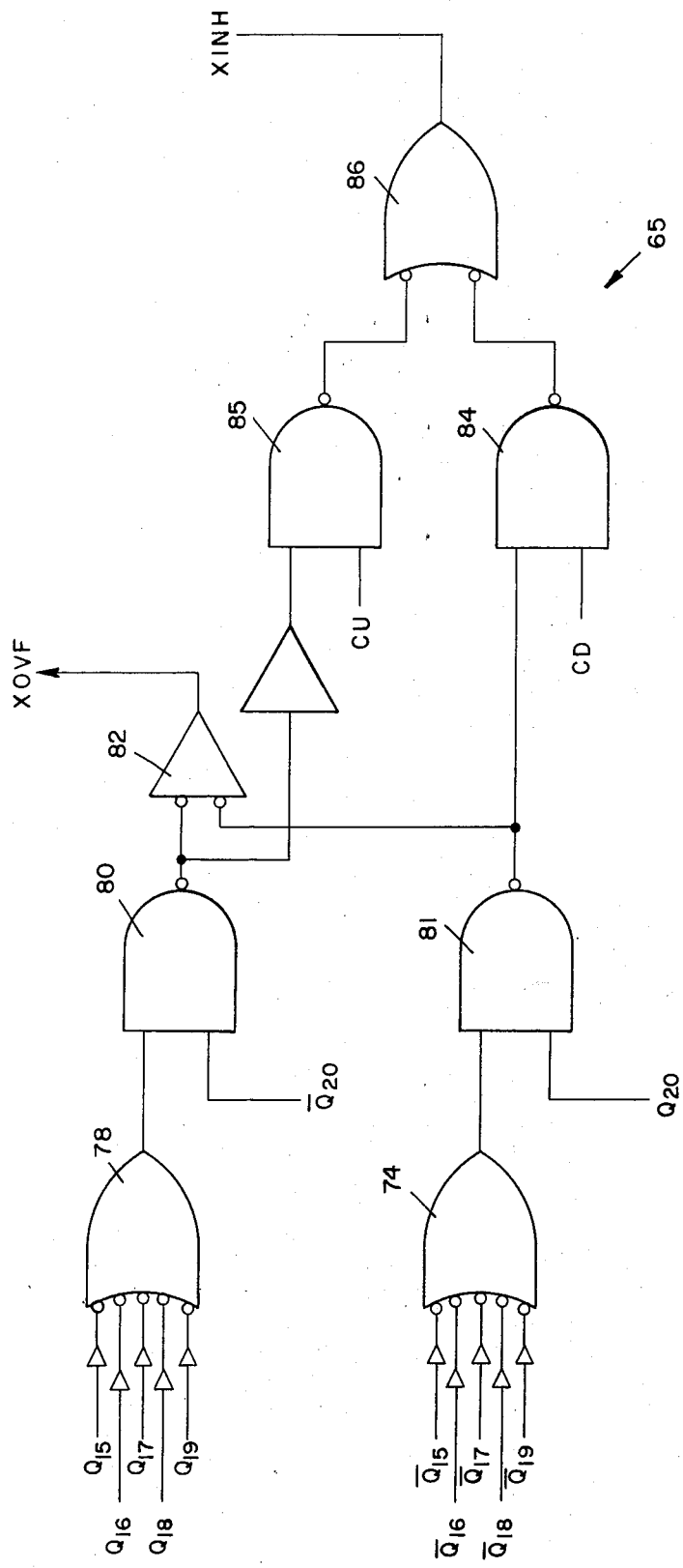
FIG. 7 is a schematic circuit diagram of the overflow logic network of FIG. 6b.

In practice, the overflow and inhibit logic time share the networks provided for the two terms of Equation (13) by combining the output signals generated by the networks for the two terms with the count control signals CU and CD at a point before those two signals are ORed to provide the signal XOVF. The two new terms of Equation (14) are ORed to provide the signal XINH. That signal is then complemented by an inverter 67, and the complement $\overline{XINH}$ is employed in the sweep clock generator to inhibit transmission of clock pulses $C_2$ in response to further increments $\Delta x$, as described with reference to FIG. 4. This prevents unnecessary exercising of the CRT deflection unit, as noted hereinbefore. As can be seen in FIG. 7, gates 78 and 79 which are NAND gates respectively receiving the terms $Q_{15}$, $Q_{16}$, $Q_{17}$, $Q_{18}$ and $Q_{19}$ and the terms $\overline{Q}_{15}$, $\overline{Q}_{16}$, $\overline{Q}_{17}$, $\overline{Q}_{18}$ and $\overline{Q}_{19}$, after passing through inverters, apply terms to gates 80 and 81 also receiving the terms $\overline{Q}_{20}$ and $Q_{20}$ to develop the signal XOVF at the output of a gate 82. A gate 84 receives the signals from the gate 81 and the term CD, and a gate 85 receives the signals from the gate 80 after passing through an inverter and the signal CU, to apply signals XINH through a gate 86.

To simplify implementation of the X counter, where frequency of operation is not a limitation on design, ripple carry logic is employed such that for any given flip-flop $Q_n$, except flip-flops $Q_1$ and $Q_2$, the logic input for each of the J and K input terminals is as follows:

$$Q_n^* = CU\, Q_{n-1}\, Q_{n-1}^* + CD\, \overline{Q}_{n-1}\, Q_{n-1}^* \quad (15)$$

where $Q_{n-1}$ is the state of the flip-flop of next lower order, and $Q_{n-1}^*$ is the corresponding logic input for the flip-flop of next lower order. The logic input $Q_n^*$ is gated by the complement of the shift enable signal (GX) produced by an inverter 68 shown in FIG. 6a. Upon the occurrence of a clock pulse $C_2$ applied in parallel to all flip-flops, the flip-flop $Q_n$ will change state in accordance with Equation (15). That is, if the control input $Q_n^*$ is true, and the flip-flop $Q_n$ is in the zero state, it will change to a one state, and vice versa. This is characteristic of a T-type flip-flop, but a J-K flip-flop is employed in order to be able to enter 2's complements of offset coordinates. Therefore, where an offset display is not required, the T-type flip-flop may be employed.

The logic input for flip-flops $Q_1$ and $Q_2$ for the ripple carry synchronous counter (without the ability to shift for entering an offset coordinate and without the scaling feature of the present invention) would be as follows:

$$Q_1^* = +5V \quad (16)$$

$$Q_2^* = CU(Q_1) + CD(Q_1^-) \quad (17)$$

where $+5V$ represents a binary 1. The signal GX provides the $+5V$ input to the flip-flop $Q_1$ during a counting function, and $Q_2^*$ is gated to the flip-flop $Q_2$ by the signal GX.

For the smallest range scale of 16 nautical miles, only the signal $S_6$ is true. That signal is combined with the logic input for the flip-flop $Q_6$ as follows:

$$Q_6^* = CU(Q_5 Q_5^*) + CD(\overline{Q}_5 Q_5^*) + S_6 \quad (18)$$

As long as the signal $S_6$ is true, the first two terms of the logic equation effectively drop out since the flip-flop $Q_6$ will change state each time a clock pulse $C_2$ occurs, regardless of what the flip-flops $Q_1$ to $Q_5$ do. Those flip-flops actually continue to operate as a synchronous binary counter of five stages unaware that the remaining flip-flops $Q_6$ to $Q_{20}$ are now operating independently as a synchronous binary counter of 15 stages. Since the operation of flips-flops $Q_1$ to $Q_5$ will not affect those 15 stages, the range scale signals $S_1$ to $S_5$ could also be true were it not for the fact that they are used in selecting different delays in initiating an unblanking control signal as described with reference to FIG. 5.

The range scale signals $S_2$ to $S_5$ are ORed with the logic inputs of flip-flops $Q_2$ to $Q_5$ as follows:

$$Q_2^* = CU\, Q_1 + CD\, \overline{Q}_1 + S_2 \quad (19)$$

$$Q_3^* = CU\, Q_2\, Q_2^* + CD\, \overline{Q}_2\, Q_2^* + S_3 \quad (20)$$

$$Q_4^* = CU\, Q_3\, Q_3^* + CD\, \overline{Q}_3\, Q_3^* + S_4 \quad (21)$$

$$Q_5^* = CU\, Q_4\, Q_4^* + CD\, \overline{Q}_4\, Q_4^* + S_5 \quad (22)$$

The range scale signal $S_1$ need not be combined with the only signal input $\overline{(GX)}$ to the flip-flop $Q_1$ since it may be permitted to change state on every clock pulse for any range scale selected, and if no lower range scale is selected smaller than 512 nautical miles (i.e., if $S_2$ to $S_6$ are all false) the desired result is achieved. The range scale signals $S_1$ is therefore only used to select an appropriate beam unblanking delay.

The logic inputs for shifting and counting are simply ORed at the J and K input terminals of the flip-flops. Accordingly, the complete logic equations for a given flip-flop $Q_n$ (except flip-flops $Q_1$ to $Q_6$ and $Q_{20}$) are as follows:

$$JQ_n^* = GXQ_{n+1} + \overline{GX}(CUQ_{n-1}Q_{n-1}^* + CD\overline{Q}_{n-1}Q_{n-1}^*) \quad (23)$$

$$KQ_n^* = GX\overline{Q}_{n+1} + \overline{GX}(CUQ_{n-1}Q_{n-1}^* + CD\overline{Q}_{n-1}Q_{n-1}^*) \quad (24)$$

For the flip-flop $Q_{20}$, the input logic is as follows:

$$JQ_{20} = LE\, D_1 + \overline{GX}(CUQ_{19}Q_{19}^* + CD\overline{Q}_{19}Q_{19}^*) \quad (25)$$

$$KQ_{20} = LE\, \overline{D}_1 + \overline{GX}(CUQ_{19}Q_{19}^* + CD\overline{Q}_{19}Q_{19}^*) \quad (26)$$

As noted hereinbefore, five sign bit flip-flops ($Q_{16}$ to $Q_{20}$) are employed to allow for substantial overflow while counting up from a positive number, or counting down from a negative number, without altering the sign bit in flip-flop $Q_{20}$. In that manner, the overflow is required to be so large for a "carry" to ripple into the flip-flop $Q_{20}$ that in practice it would never occur, and yet the sign bit in the flip-flop $Q_{20}$ will change from positive to negative on the next clock pulse $C_2$ when counting down through zero, and from negative to positive when counting up through zero. That allows for moving any point on the PPI display to the center by loading the counters with the complements of the coordinates of that point during radar dead time.

The full logic input equations for the flip-flops $Q_1$ and $Q_2$ are as follows:

$$JQ_1^* = GXQ_2 + \overline{GX} \quad (27)$$

$$KQ_1^* = GX\overline{Q}_2 + \overline{GX} \quad (28)$$

$$JQ_2^* = GXQ_3 + \overline{GX}(CUQ_1 + CD\overline{Q}_1 + S_2) \quad (29)$$

$$KQ_2^* = GX\overline{Q}_3 + \overline{GX}(CUQ_1 + CD\overline{Q}_1 + S_2) \quad (30)$$

For the remaining flip-flops $Q_3$ to $Q_6$, the following general equations will apply:

$$JQ_n^* = GXQ_{n+1} + \overline{GX}(CUQ_{n-1}Q_{n-1}^* + CD\overline{Q}_{n-1}Q_{n-1}^* + S_i) \quad (31)$$

$$KQ_n^* = GX\overline{Q}_{n+1} + \overline{GX}(CUQ_{n-1}Q_{n-1}^* + CD\overline{Q}_{n-1}Q_{n-1}^* + S_i) \quad (32)$$

where $n$ and $i$ both equal to 3, 4, 5 or 6. By comparing those equations with the general logic equations for flip-flops $Q_7$ to $Q_{19}$, it may be seen they are the same in that they include two terms, one term for shifting and one term for counting. The only difference is that the term for synchronous counting with ripple carry includes within it a scaling control term $S_i$.

Figure 6B:
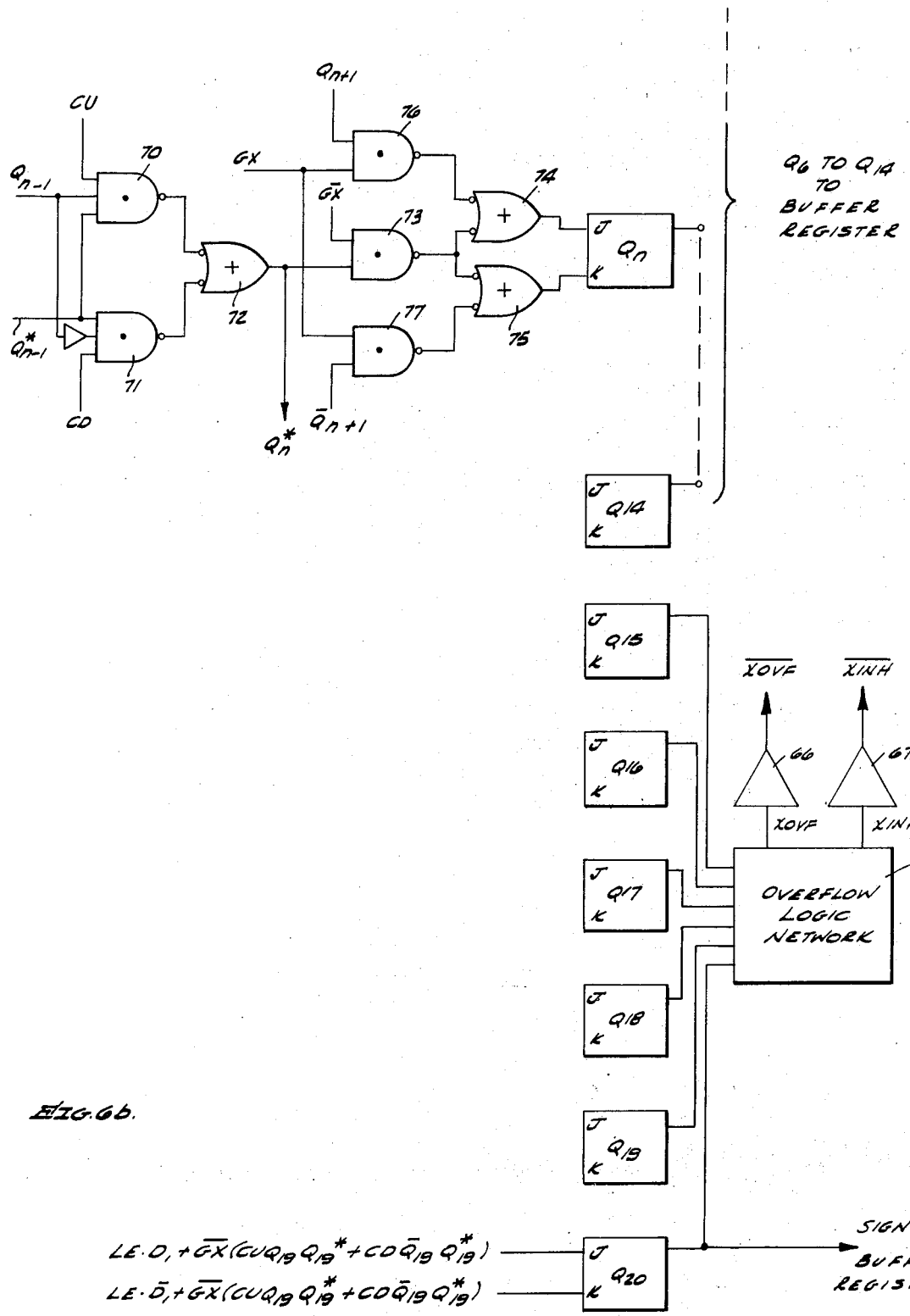
Figure 6C:
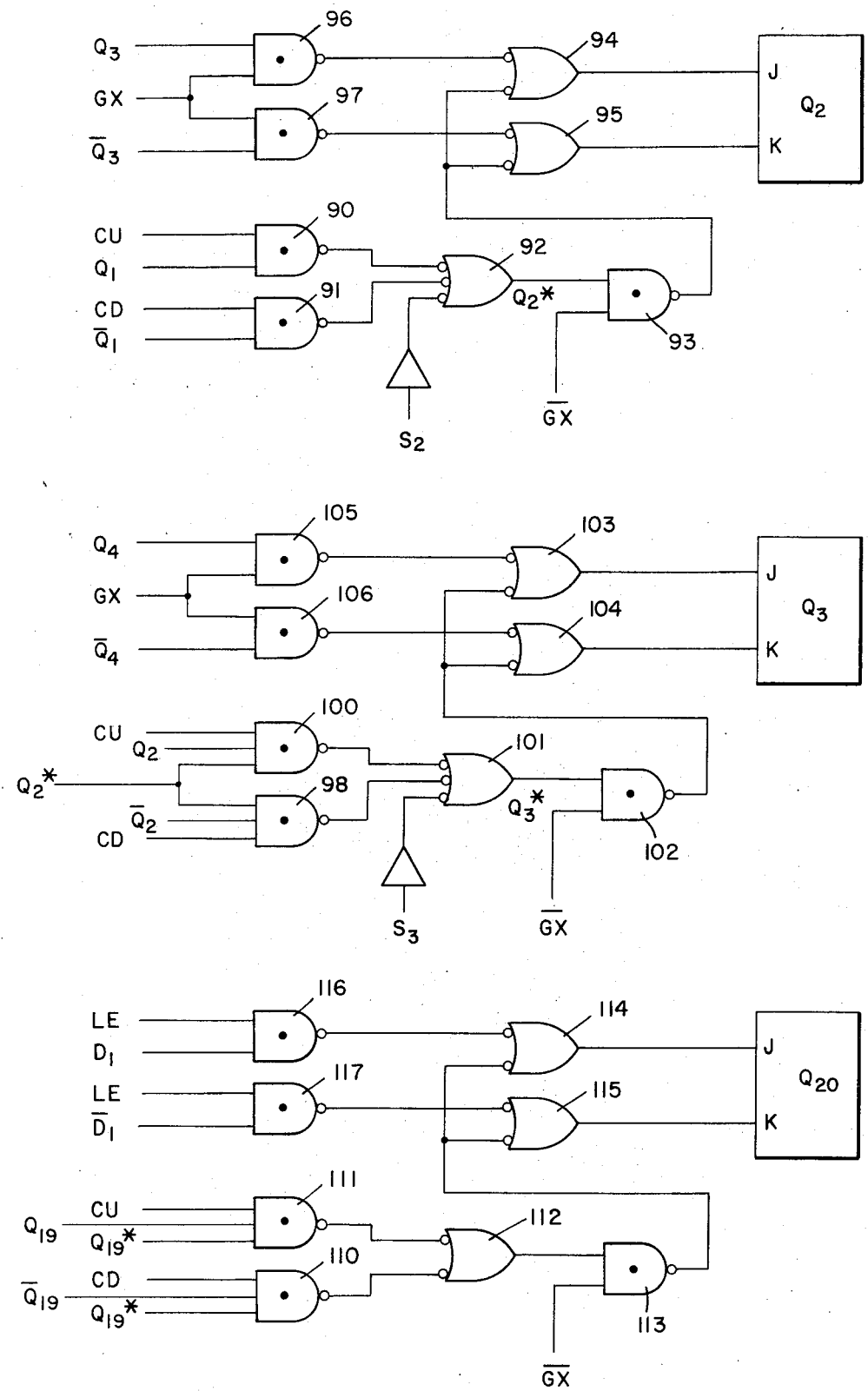

The complete logic for the first seven stages from the flip-flop $Q_1$ to $Q_7$ is shown in FIG. 6a using Boolean logic equations in place of NAND gates for the flip-flops $Q_2$ to $Q_7$. All of the remaining thirteen stages are implemented in the manner shown in FIG. 6b for an exemplary stage (flip-flop $Q_n$), except the last stage where the first term of the logic equations shown differ in that the load enable (LE) signal replaces the shift enable (GX) signal, and the signals $D_1$ and $\overline{D}_1$ replace the signals $Q_{n+1}$ and $\overline{Q}_{n+1}$ because that stage is operated in the shift mode for only 15 clock periods, whereas all the other stages operate in the shift mode for 15 to 20 clock periods. FIG. 6c shows counter stages $Q_2$, $Q_3$ and $Q_{20}$ for further clarity of the counter logic mechanization. The gating logic is thus shown for the flip-flops $Q_1$ (FIG. 6a), $Q_2$, $Q_3$, $Q_n$ (FIG. 6b) and $Q_{20}$. The gating logic for the flip-flops $Q_4$ to $Q_6$ is similar to the logic for flip-flops $Q_3$ except for the subscript of the received terms and the gating logic for the flip-flops $Q_6$ to $Q_{19}$ is similar to the flip-flop $Q_n$ except for the subscript of the terms. As seen in FIG. 6c, the flip-flop $Q_2$ has a term $Q_2^*$ provided by NAND gates 90 and 91 and a NAND gate 92 operating as an OR gate to apply the term $Q_2^*$ to a gate 93 which in response to the count control signal $\overline{GX}$ applies a signal through NAND gates 94 and 95. The terms are respectively applied from the gates 94 and 95 to the J and K inputs of the flip-flop $Q_2$. The terms $Q_3$ GX and $\overline{Q}_3$ GX are provided from gates 96 and 97 to respective gates 94 and 95. The flip-flop $Q_3$ is controlled by similar gates 98, 100 and 101 providing the term $Q_3^*$ to a gate 102 receiving the term $\overline{GX}$ and applying the term $Q_3^*$ to gates 103 and 104. Gates 105 and 106 apply the term $Q_4$ GX and $\overline{Q}_4$ GX to the respective gates 103 and 105 which are in turn coupled to the J and K inputs of the flip-flop $Q_3$.

Although ripple carry logic has been disclosed for the entire synchronous counter, it should be recognized that parallel logic could be employed where the signal $Q_n^*$ for a given state will depend upon the states of lower-order stages An advantage of parallel logic is higher counting rates, but the network for generating the signal $Q_n^*$ gets progressively wider for successive stages, and the network for introducing the scaling control would then be more complex. A feasible compromise would be to implement the first six stages with ripple carry logic in order to be able to simply OR in the scaling control signal at only one point in the network. The signal $Q_6^*$ from the network of the sixth stage may then be carried forward to all other stages in parallel with parallel logic for each of those other stages. However, the logic network will become wide for the last few stages, and since only the flip-flops $Q_6$ to $Q_{14}$ are monitored, except for the sign bit position (flip-flop $Q_{20}$), the advantage of speed can be achieved with parallel logic for those monitored stages and ripple carry logic from the stage of flip-flop $Q_{14}$ to the flip-flop $Q_{20}$. Such an arrangement will allow all monitored bits, except the sign bit, to change states quickly and simultaneously for transfer to the buffer register of the A/D unit. If the last six stages are implemented with ripple carry logic, there will be a delay before the sign bit settles for transfer to the buffer register. Accordingly, to minimize that delay, parallel logic may be employed for the last six stages by feeding forward the signal $Q_{15}^*$ to the stages of flip-flops $Q_{16}$ to $Q_{20}$.

From the foregoing, it may be seen that scaling for a conventional synchronous counter of M stages, such as 15, may be provided by prefixing any number $(n-1)$ of binary counting stages, such as 5, and to the conventional synchronous counting logic in each of the lower stages from stage 1 to stage N, providing a scaling control. The binary output of the counter stages to which the scaling stages are prefixed will then scale the counted input pulses accordingly. Logic for entering any number is provided with scaling by shifting the number entered to positions of lower order. Although serial shifting is disclosed for both entering and scaling a number, it should be understood that the number may be entered in parallel and then scaled by shifting, or it may be entered and scaled simultaneously by parallel input logic.

Stages of lower order thus the least significant bit position selected for scaling may be time shared as overflow flip-flops by providing suitable logic gates energized by the scaling control signal, each time effectively moving the stored sign to the last (most significant) flip-flops of the modified counter. This would result in a different number of overflow flip-flops for each range scale, and none at all for the greatest range scale, but such a time sharing arrangement may be employed in applications where the possibility of an overflow is not critical, or in a system where logic gates are provided to block any overflow into the most significant bit position except when passing through zero for an offset display.

Although the present invention has been described in connection with a particular embodiment, it is recognized that modifications and variations may readily occur to those skilled in the art. Therefore, it is intended that the claims appended thereto be interpreted to cover modifications and variations which come within the true scope and spirit of the present invention.

What is claimed is:

1. A synchronous counter having $(n-1)+M$ binary stages for counting pulses representing events with one of $n$ scales having scaling factors $2^0$ to $2^{n-1}$, where n and M are both integers and each integer is independently selected for a particular environment to meet operating requirements, said counter having M fixed output terminals from the most significant stages and means for selecting one of $n$ scales with a control signal applied to a selected one of $n-1$ successively more significant stages than the least significant stage to change state with each of said pulses, whereby the scaling factor of $2^{n-1}$ is selected if no control signal is applied to any stage, and the scaling factor decreases from $2^{n-1}$ to 2 as said control signal is applied to a stage of successively higher order.

2. A synchronous counter as defined in claim 1 wherein the least significant n stages are cascaded with ripple carry logic gates to cause a given stage to change state in response to a pulse to be counted under control of a ripple carry signal that is true as a function of a signal representing the state of the next less significant stage and a ripple carry signal into that next less significant stage, both being true, and wherein said selecting means comprises means for ORing a control signal with the same polarity and amplitude as a true ripple carry signal into a selected stage.

3. In a system for counting pulses representing events in order to continually present at output terminals of a fixed number of cascaded stages a binary number which changes as said pulses are counted, apparatus for scaling the pulses counted, comprising:
  a plurality of cascaded counting stages prefixed to said fixed number of stages, each of said prefixed stages being adapted to count with the same radix as each stage of said fixed number; and
  scaling means for forcing a selected one of said prefixed counting stages to respond directly to said pulses for counting as the order of least significance in a counter thus comprising said fixed number of stages and a number of prefixed stages.

4. Apparatus as defined in claim 3 wherein each of said prefixed stages comprises a flip-flop having a count control input which is true to cause said flip-flop to change state in response to a pulse to be counted as a function of only the state of a flip-flop in a preceding stage and the control input signal of said preceding stage, except the first stage which comprises a flip-flop adapted to count every pulse representing an event and the second stage which comprises a flip-flop having a count control input which is true to cause said second stage flip-flop to change state in response to a pulse to be counted as a function of only the state of said first stage flip-flop, and said scaling means comprises means for forcing said count control input signal of a given prefixed stage to be true, thereby causing said given prefixed stage to change state in response to each pulse representing an event.

5. In a system for counting clock pulses generated at a rate which varies as a function of some variable to continually present successive approximate values of said function at output terminals of a fixed number of cascaded stages, apparatus for scaling said values comprising:
a plurality of cascaded counting stages prefixed to said fixed number of stages, the first of said fixed number of stages being adapted to count the output of the last of said prefixed stages; and
scaling means for causing a selected one of said prefixed counting stages to count said clock pulses directly in complete disregard to operation of other prefixed counting stages which cascade into said selected one of said prefixed counting stages.

6. Apparatus as defined in claim 5 wherein each of said fixed and prefixed counting stages is a binary counting stage with input logic means for operation as a synchronous counter.

7. Apparatus as defined in claim 6 wherein said input logic means for each of said prefixed counting stages is for operation as a synchronous counter with ripple carry whereby the count control input signal of a given prefixed stage is a unique function of only the state of a preceding stage and the control input signal of said preceding stage, and said scaling means comprises means for forcing said count control input signal of a given prefixed stage to be true, thereby causing said given prefixed stage to change state in response to each of said generated pulses.

8. Apparatus as defined in claim 7 wherein said logic means includes control means for counting up said generated pulses when said function is positive and counting down said generated pulses when said function is negative, and wherein negative values are represented in said counter in 2's complement form, and including at least one counting stage appended to said fixed number of stages to store the sign of said values, and provide automatically a change in sign as said fixed number of stages count down through zero from a positive value and count up through zero from a negative value, where a positive sign is represented by a binary 0, and a negative sign by a binary 1.

9. Apparatus as defined in claim 8 including:
a plurality of stages appended in cascade to said fixed number of cascaded stages to store the sign of a given series of values;
means for entering the sign of a starting value of said series in every stage appended, whereby significant overflow may occur as said counter counts up from a positive value, and counts down from a negative value, without changing the sign in the last cascaded stage appended to said counter; and
means for detecting an overflow by comparing the state of said last cascaded stage with each of the other stages appended, whereby an overflow is indicated when any difference occurs between the state of said last cascaded stage and any one of the other stages appended.

10. Apparatus as defined in claim 9 including means responsive to said overflow detecting means for inhibiting said generated pulses from being counted when an overflow is indicated and said generated pulses are being counted up with a positive sign in said last cascaded stage, and said generated pulses are being counted down with a negative sign in said last cascaded stage.

11. In apparatus for digital control of an object's position in response to a train of pulses, the combination comprising:
a synchronous counter adapted to receive said pulses, said counter having $(n-1)+M$ binary stages and M output terminals from the most significant stages of said counter monitored for controlling the position of said object, where $n$ and M are both integers and each integer is independently selected for a particular environment to meet operating requirements; and
means for scaling a change in position of said object in response to pulses of said train by applying a scaling control signal to a selected one of $n-1$ successively more significant stages than the least significant stage to change state with each of said pulses, whereby a scaling factor of $2^{n-1}$ is selected if no control signal is applied to any stage, and the scaling factor selected decreases from $2^{n-1}$ to $2^0$ as said control signal is applied to a stage of successively higher order from the second to the $n$th stage.

12. The combination of claim 11 wherein said synchronous counter includes control means for counting said pulses up from a positive number of a more positive number and from a negative number expressed in the 2's complement form to a positive number, and for counting said pulses down from a negative number to a more negative number expressed in the 2's complement form and from a positive number to a negative number, and said counter includes one counting stage in the most significant position as a sign digit stage to store the sign of a number in said counter at any given time, and provide automatically a change in sign as said counter counts down through zero from a positive value and counts up through zero from a negative value, where a positive sign is represented by a binary 0, and negative sign by a binary 1.

13. The combination of claim 12 wherein said synchronous counter includes a plurality of stages connected in cascade between the most significant of said M binary digit stages monitored for controlling the position of said object and said sign digit stage, and said apparatus includes means for initially copying the sign digit of a starting number into those stages of said plurality of stages more significant than a stage into which a binary digit of said starting number has been entered, said combination including means for detecting an overflow by comparing the state of said sign digit stage with each of said plurality of cascaded stages, whereby an overflow is indicated when any difference occurs between the state of said sign digit stage and any one of said plurality of stages.

* * * * *